US012715723B2

(12) United States Patent
Koga et al.

(10) Patent No.: US 12,715,723 B2
(45) Date of Patent: Aug. 25, 2026

(54) SHEET CONVEYANCE APPARATUS AND SHEET CONVEYANCE SYSTEM

(71) Applicant: CANON KABUSHIKI KAISHA, Tokyo (JP)

(72) Inventors: Hiroto Koga, Chiba (JP); Kohei Mizuguchi, Ibaraki (JP); Takahiro Ito, Chiba (JP); Toshiki Ishida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/257,834

(22) Filed: Jul. 2, 2025

(65) Prior Publication Data

US 2026/0015192 A1 Jan. 15, 2026

(30) Foreign Application Priority Data

Jul. 12, 2024 (JP) ................................ 2024-112788

(51) Int. Cl.
*B65H 5/00* (2006.01)
*G03G 15/00* (2006.01)
*G03G 21/16* (2006.01)

(52) U.S. Cl.
CPC ........... *B65H 5/00* (2013.01); *G03G 15/6502* (2013.01); *G03G 21/1633* (2013.01); *G03G 21/1638* (2013.01); *B65H 2402/441* (2013.01); *B65H 2601/11* (2013.01)

(58) Field of Classification Search
CPC .. B65H 5/00; G03G 15/6502; G03G 21/1633; G03G 21/1638; G03G 15/6529
See application file for complete search history.

(56) References Cited

U.S. PATENT DOCUMENTS

| | | | | |
|---|---|---|---|---|
| 9,983,535 | B2 | 5/2018 | Ozawa | |
| 10,545,449 | B2 * | 1/2020 | Ozawa | G03G 15/6502 |
| 2004/0041333 | A1 | 3/2004 | Izumi et al. | |
| 2015/0102549 | A1 * | 4/2015 | Taoka | B65H 3/44 271/3.08 |

FOREIGN PATENT DOCUMENTS

JP 2017194543 A 10/2017

OTHER PUBLICATIONS

Extended European search report issued in European Appln. No. 25188032.4 mailed on Dec. 1, 2025.

* cited by examiner

*Primary Examiner* — Christle I Marshall
(74) *Attorney, Agent, or Firm* — ROSSI, KIMMS & McDOWELL LLP

(57) ABSTRACT

A sheet conveyance apparatus configured to be detachably connected to a door unit including a door member configured to be opened and closed, the sheet conveyance apparatus includes a conveyance portion configured to convey a sheet, a casing configured to accommodate the conveyance portion to face the door unit, a lock portion supported movably with respect to the casing to a lock position where the lock portion locks the casing to the door unit and to a release position where the lock portion releases a lock between the casing and the door unit, and a moving member supported movably by the casing, the moving member being configured to move the lock portion from the lock position to the release position by being pressed by the door member being opened in a state where the casing is not moved with respect to the door unit.

15 Claims, 9 Drawing Sheets

SHEET CONVEYANCE APPARATUS AND SHEET CONVEYANCE SYSTEM

BACKGROUND

Field of the Technology

The present disclosure relates to a sheet conveyance apparatus for conveying sheets, and a sheet conveyance system equipped with the same.

Description of the Related Art

Japanese Patent Application Laid-Open Publication No. 2017-194543 discloses an image forming apparatus, and a storage device connected to a side area of the image forming apparatus. The image forming apparatus is equipped with an opening/closing member that is disposed at a position facing the storage device and that may be opened and closed. The storage device includes a link member that is movable in the up-down direction with respect to an engagement boss disposed on a supporting base fixed to the image forming apparatus, and the storage device is locked via the supporting base to the image forming apparatus by having the link member engage with the engagement boss. When the opening/closing member of the image forming apparatus is opened in a state where the storage device is locked to the image forming apparatus, the opening/closing member pushes the storage device. Thereby, the storage device moves in a direction separating from the image forming apparatus, and the engagement boss of the supporting base pushes an inclined surface of the link member, by which the locking of the engagement boss and the link member is released.

According to Japanese Patent Application Laid-Open Publication No. 2017-194543, however, when opening the opening/closing member, the movement of the storage device being pushed by the opening/closing member and the movement of the link member in the upper direction for releasing the locking of the link member and the engagement boss are performed in parallel. Therefore, in order to open the opening/closing member, both a force for moving the storage device, which is a heavy object accommodating a large amount of sheets, in the horizontal direction and a force for moving the link member beyond the engagement boss are required, such that a large operating force is needed.

SUMMARY

According to one aspect of the present disclosure, a sheet conveyance apparatus configured to be detachably connected to a door unit including a door member configured to be opened and closed, the sheet conveyance apparatus includes a conveyance portion configured to convey a sheet, a casing configured to accommodate the conveyance portion to face the door unit, a lock portion supported movably with respect to the casing to a lock position where the lock portion locks the casing to the door unit and to a release position where the lock portion releases a lock between the casing and the door unit, and a moving member supported movably by the casing, the moving member being configured to move the lock portion from the lock position to the release position by being pressed by the door member being opened in a state where the casing is not moved with respect to the door unit.

Features of the present disclosure will become apparent from the following description of embodiments with reference to the attached drawings. The following description of embodiments is described by way of example.

DESCRIPTION OF THE EMBODIMENTS

Entire Configuration

Figure 1:
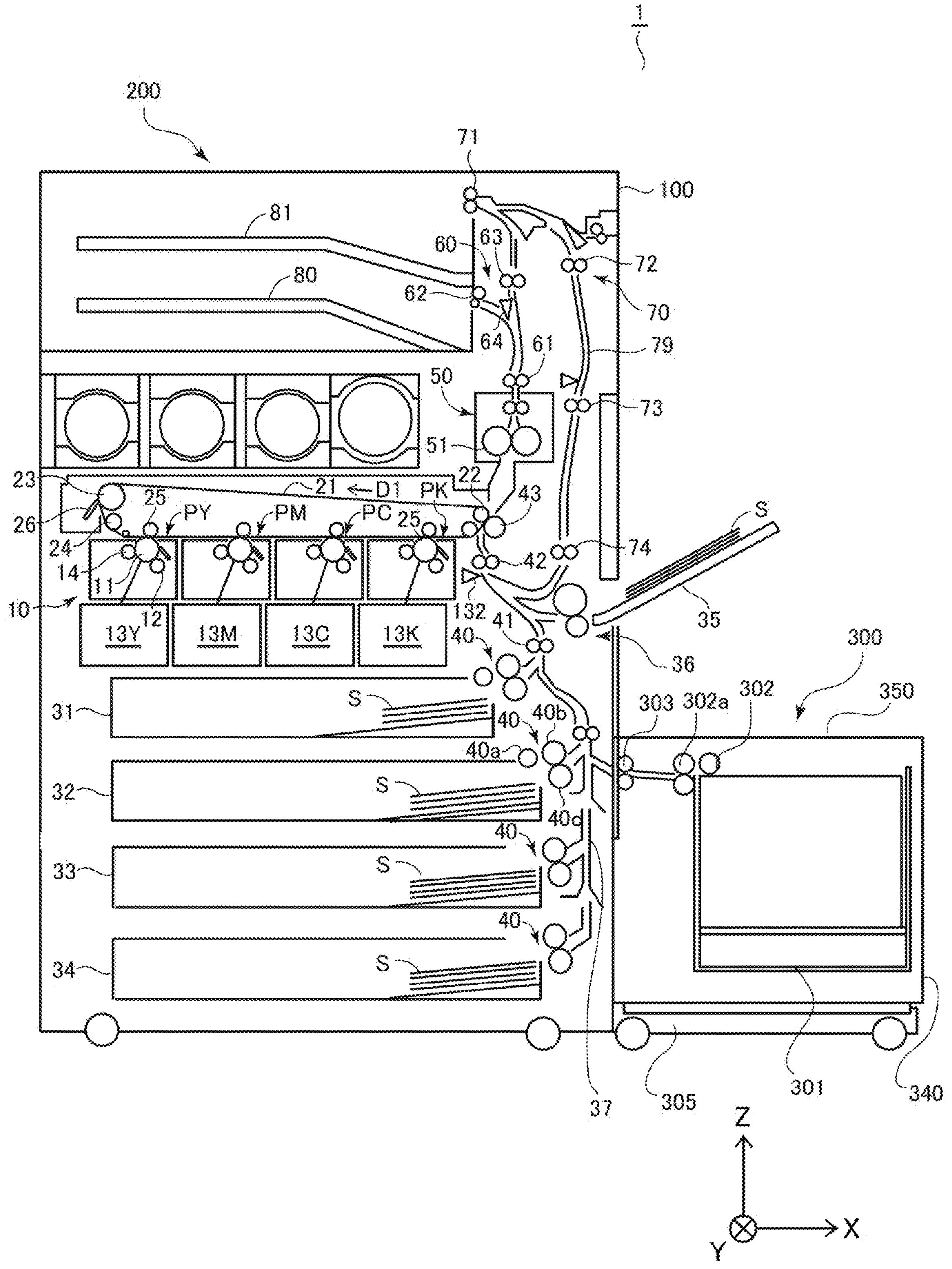
FIG. 1 is a schematic drawing of a sheet conveyance system according to a present embodiment.

Embodiments for carrying out the present disclosure will be described in detail below with reference to the drawings. FIG. 1 is a schematic drawing of a sheet conveyance system 1 according to the present embodiment. The sheet conveyance system 1 includes an image forming apparatus 200 serving as a door unit, and a sheet feed deck 300 detachably attached to a right side surface of the image forming apparatus 200.

The image forming apparatus 200 is a full color laser printer adopting an electrophotographic system that forms and outputs an image on a sheet S serving as a recording medium based on an image information entered from an external computer. Sheet materials formed of various materials and having different sizes, such as paper including normal paper and envelope paper, glossy paper, plastic films such as overhead projector sheets, and cloths, may be used as the sheet S.

An apparatus body 100 of the image forming apparatus 200 accommodates an image forming engine 10 equipped with four process cartridges PY, PM, PC, and PK for forming toner images of yellow, magenta, cyan, and black, and an intermediate transfer belt 21. The process cartridges PY to PK each include a photosensitive drum 11 serving as an image bearing member, i.e., electrophotographic photosensitive member, and forms a toner image on the photosensitive drum 11. The toner image borne on the photosensitive drum 11 is transferred via the intermediate transfer belt 21 serving as an intermediate transfer body onto the sheet S.

In the following descriptions and drawings, a Z direction refers to an upward direction along a vertical direction, i.e., gravity direction, in a state where the image forming apparatus 200 is installed on a horizontal plane. A Y direction refers to a rotational axis direction of the photosensitive drum 11. The Y direction corresponds to a main scanning direction when forming an image and also corresponds to a sheet width direction perpendicular to a sheet conveyance direction of the sheet conveyed inside the image forming apparatus 200. The Y direction is a direction intersecting the Z direction, preferably orthogonally. An X direction refers to a horizontal direction orthogonal to the Y direction.

The process cartridges PY to PK are configured similarly except for the different toner colors used for developing image, such that the yellow process cartridge PY is taken as an example to described the process cartridge and a toner image forming process, i.e., image forming operation. The process cartridge PY includes, in addition to the photosensitive drum 11, a charging roller 12 serving as a charging unit, an exposing unit 13Y, a developing unit 14, and a drum cleaner. The photosensitive drum 11 is a drum-shaped photosensitive member having a photosensitive layer disposed on an outer circumference portion, and rotates in a direction along a rotational direction D1 of the intermediate transfer belt 21, i.e., clockwise direction in the drawing. The charging roller 12 charges a surface of the photosensitive drum 11 uniformly, and the exposing unit 13Y irradiates the photosensitive drum 11 with a laser light modulated according to a signal, i.e., video signal, based on a yellow color component of image information, by which an electrostatic latent image on the surface of the photosensitive drum 11 is developed as a toner image.

The image forming operation described above is performed in parallel in the respective process cartridges PY to PK. In this state, each of the exposing units 13M, 13C, and 13K perform an exposure process based on a video signal corresponding to the respective color components of the image information. Then, by having each developing unit 14 perform a developing process using a developer containing toner of the respective colors, magenta, cyan, and black toner images are formed on the photosensitive drums 11. The toner images formed on the respective photosensitive drums 11 are primarily transferred to the intermediate transfer belt 21 by primary transfer rollers 25 serving as primary transfer devices. Residual toner remaining on the photosensitive drum 11 after transfer is removed by a drum cleaner.

The intermediate transfer belt 21 is stretched across a secondary transfer inner roller 22, a stretch roller 23, a tension roller 24, and the primary transfer roller 25, and is driven to rotate in a counterclockwise direction (D1) in the drawing. By having the toner images of four colors superposed in multilayers on the intermediate transfer belt 21 being conveyed, a full color toner image is formed on the intermediate transfer belt 21. This image is borne on the intermediate transfer belt 21 and conveyed to a transfer portion, i.e., secondary transfer portion, configured as a nip portion between a secondary transfer roller 43 and the secondary transfer inner roller 22. By having a bias voltage with an opposite polarity as a toner charge polarity applied to the secondary transfer roller 43 serving as a transfer unit, the image borne on the intermediate transfer belt 21 is secondarily transferred to the sheet S. Residual toner remaining on the intermediate transfer belt 21 after transfer is removed by a transfer cleaner 26.

The sheet S onto which the image has been transferred is conveyed to a fixing unit 50. The fixing unit 50 includes a fixing roller pair 51 that nips and conveys the sheet S, and a heat source such as a halogen lamp, by which pressure and heat are applied to the toner image borne on the sheet S. Thereby, toner particles are melted and fixed, and a fixed image fixed onto the sheet S is acquired.

Next, a conveyance operation of the sheet S by the image forming apparatus 200 will be described. Sheet feed cassettes 31, 32, 33, and 34 serving as an example of sheet storage units accommodate the sheets S and are attached in a drawable manner to the apparatus body 100. The sheets S accommodated in a stacked state in the sheet feed cassettes 31, 32, 33, and 34 are fed one by one by a sheet feed unit 40. The sheet feed unit 40 includes a pickup roller 40*a* that sends out the sheets S from the sheet feed cassettes 31, 32, 33, and 34, and a feed roller 40*b* that receives and conveys the sheets S from the pickup roller 40*a*. Further, the sheet feed unit 40 includes a separation roller 40*c* that separates the sheet S being conveyed by the feed roller 40*b* from other sheets S. In FIG. 1, the pickup rollers 40*a* corresponding to the sheet feed cassettes 33 and 34 are not shown.

The separation roller 40*c* restricts sheets S other than the sheet S in contact with and being conveyed by the feed roller 40*b*, that is, the uppermost sheet S, from being fed in a multi-feed manner by applying a frictional force to the sheet S at a separation nip where the feed roller 40*b* and the separation roller 40*c* abut against one another. The sheet feed unit 40 is one example of a feeding unit for feeding the sheet S, and other types of feeding units such as a belt system, in which the sheet S is sucked onto a belt member by a suction fan and conveyed, or a friction separation type feeding unit using a pad may be adopted. Further, the user may set the sheet S on a manual feed tray 35 disposed on a side portion of the apparatus body 100, and the sheet S set on the manual feed tray 35 is conveyed by a sheet feed unit 36.

The sheet S sent out from the sheet feed unit 40 is conveyed via a pre-registration roller pair 41 to a registration roller pair 42. Skewing of the sheet S is corrected by having the pre-registration roller pair 41 convey the sheet S such that a leading edge of the sheet S, that is, a downstream edge of the sheet in the conveyance direction, abuts against a nip portion of the registration roller pair 42 in a stopped state and the sheet S is warped so as to form a loop. Thereafter, the registration roller pair 42 sends out the sheet S to the secondary transfer portion at a timing synchronized with the image forming operation of the process cartridges PY to PK. As described, alignment of position of the sheet S and the image formed on the sheet S is performed by the registration roller pair 42, serving as an example of a registration unit. The sheet S onto which a toner image has been transferred at the secondary transfer portion and having the image fixed thereto at the fixing unit 50 is transferred to a sheet discharge portion 60, then conveyed by a post-fixing roller pair 61 toward a switching member 64 capable of switching conveyance paths of the sheet S.

In a state where forming of image on the sheet S is completed, the sheet S having an image formed on a first surface, i.e., front surface, is discharged onto a first sheet discharge tray 80 by a sheet discharge roller pair 62. When forming an image on a second surface, i.e., back surface, of the sheet S, the sheet S is transferred by the switching member 64 via a conveyance roller pair 63 to a reverse conveyance portion 70. The reverse conveyance portion 70 includes a reverse conveyance roller pair 71 for performing reverse conveyance, i.e., switchback, of the sheet S, and a duplex conveyance path 79 that guides the sheet S being subjected to switchback by the reverse conveyance roller pair 71 toward the registration roller pair 42. After conveying the sheet S for a predetermined distance toward a discharge space above the first sheet discharge tray 80, the reverse conveyance roller pair 71 conveys the sheet S to the reverse direction, by which the sheet S is sent into the duplex conveyance path 79.

A plurality of conveyance roller pairs 72, 73, and 74 are arranged in the duplex conveyance path 79 serving as a conveyance path, which convey the sheet S to the registration roller pair 42 again. The sheet S having an image formed on the second surface by passing through the secondary transfer portion and the fixing unit 50 is discharged by the sheet discharge roller pair 62 onto the first sheet discharge tray 80. Further, the reverse conveyance roller pair 71 may also discharge the sheet onto a second sheet discharge tray 81 positioned above the first sheet discharge tray 80.

The image forming engine 10 described above is an example of an image forming unit, and alternatively, for example, the image forming unit may be a direct transfer system in which the toner image formed on the photosensitive member is directly transferred onto the sheet at the transfer portion. Further, the configuration of the image forming unit may also be an inkjet system or an offset printing system.

Control System

Figure 2:
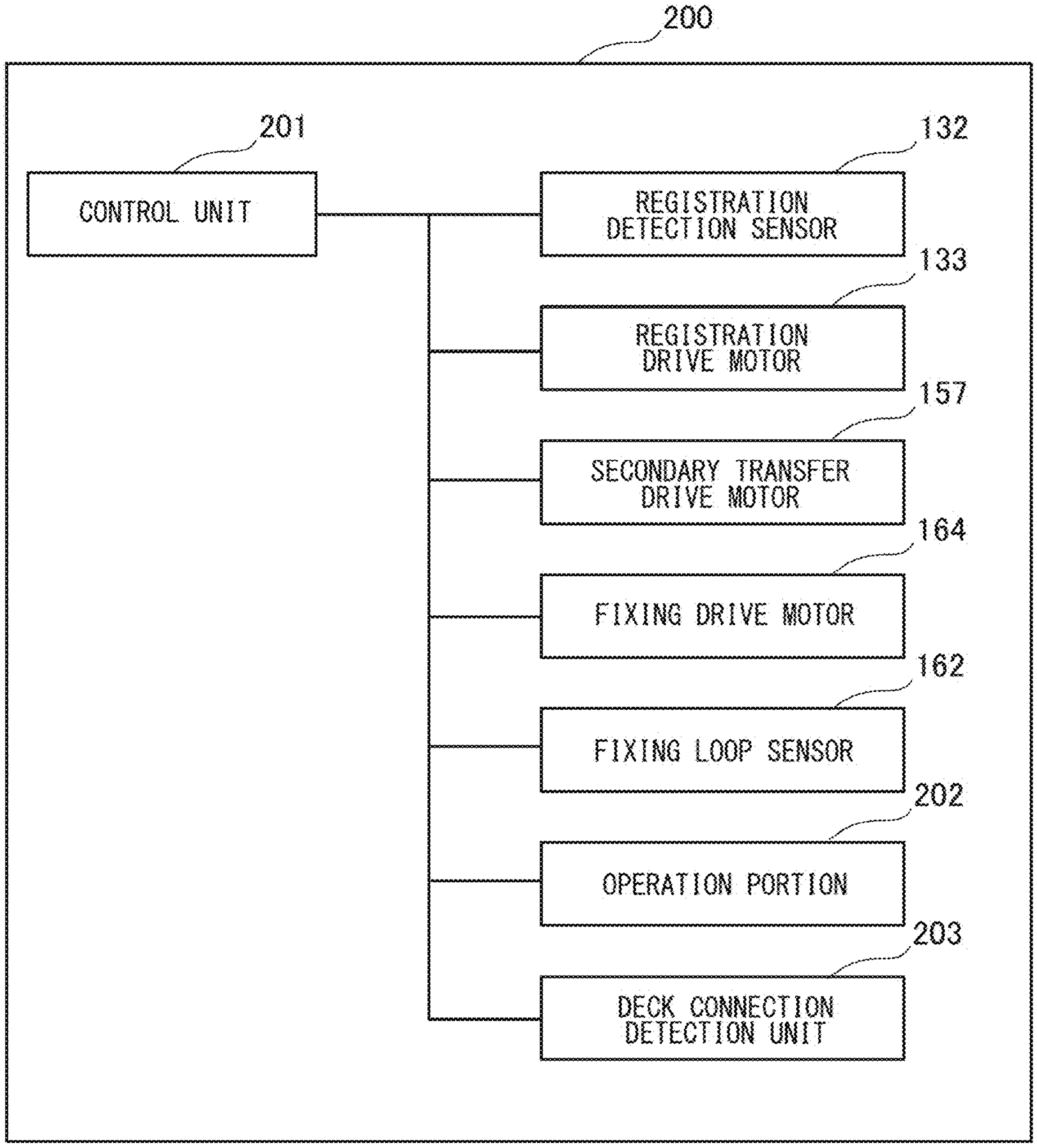
FIG. 2 is a block diagram illustrating a control system of an image forming apparatus.

FIG. 2 is a block diagram illustrating a control system of the image forming apparatus 200. As illustrated in FIG. 2, the image forming apparatus 200 includes a control unit 201. The control unit 201 includes a Central Processing Unit (CPU), a Read Only Memory (ROM), and a Random Access Memory (RAM). Various programs are stored in the ROM, and the CPU reads and executes the programs in the ROM. The RAM is used as an operation area of the CPU. A registration detection sensor 132, a fixing loop sensor 162, and a deck connection detection unit 203 are connected to an input side of the control unit 201. A registration drive motor 133, a secondary transfer drive motor 157, and a fixing drive motor 164 are connected to an output side of the control unit 201. Further, an operation portion 202 is connected to the control unit 201.

The registration detection sensor 132 (refer to FIG. 1) is arranged upstream of the registration roller pair 42 in the sheet conveyance direction, and detects a leading edge position of the sheet. The control unit 201 performs drive control of the registration roller pair 42 based on a timing at which the registration detection sensor 132 has detected the leading edge of the sheet S. The fixing loop sensor 162 detects an amount of looping, i.e., warping, of the sheet S formed between the secondary transfer roller 43 and secondary transfer inner roller 22 and the fixing roller pair 51. The control unit 201 controls a rotational speed of the fixing roller pair 51 based on the detection result of the fixing loop sensor 162.

The deck connection detection unit 203 detects that the sheet feed deck 300 has been attached to the image forming apparatus 200. By having the control unit 201 output a feed command to the sheet feed deck 300 in a state where the attachment of the sheet feed deck 300 to the image forming apparatus 200 is detected by the deck connection detection unit 203, the sheet S may be fed from the sheet feed deck 300.

The registration drive motor 133, the secondary transfer drive motor 157, and the fixing drive motor 164 drives the registration roller pair 42, the secondary transfer inner roller 22, and the fixing roller pair 51. The control unit 201 may control the rotational speeds of the registration roller pair 42, the secondary transfer inner roller 22, and the fixing roller pair 51 by controlling the registration drive motor 133, the secondary transfer drive motor 157, and the fixing drive motor 164.

The operation portion 202 is attached to the apparatus body 100 of the image forming apparatus 200, and is composed of an operation panel including a touch panel and physical keys. The user can enter attribute information of the sheet S, such as the size and grammage of the sheet S conveyed to the operation portion 202. The attribute information of the sheet S can be set for each of the feed sources, such as the sheet feed cassettes 31, 32, 33, and 34, the manual feed tray 35, and the sheet feed deck 300.

Comparative Example

Figure 3:
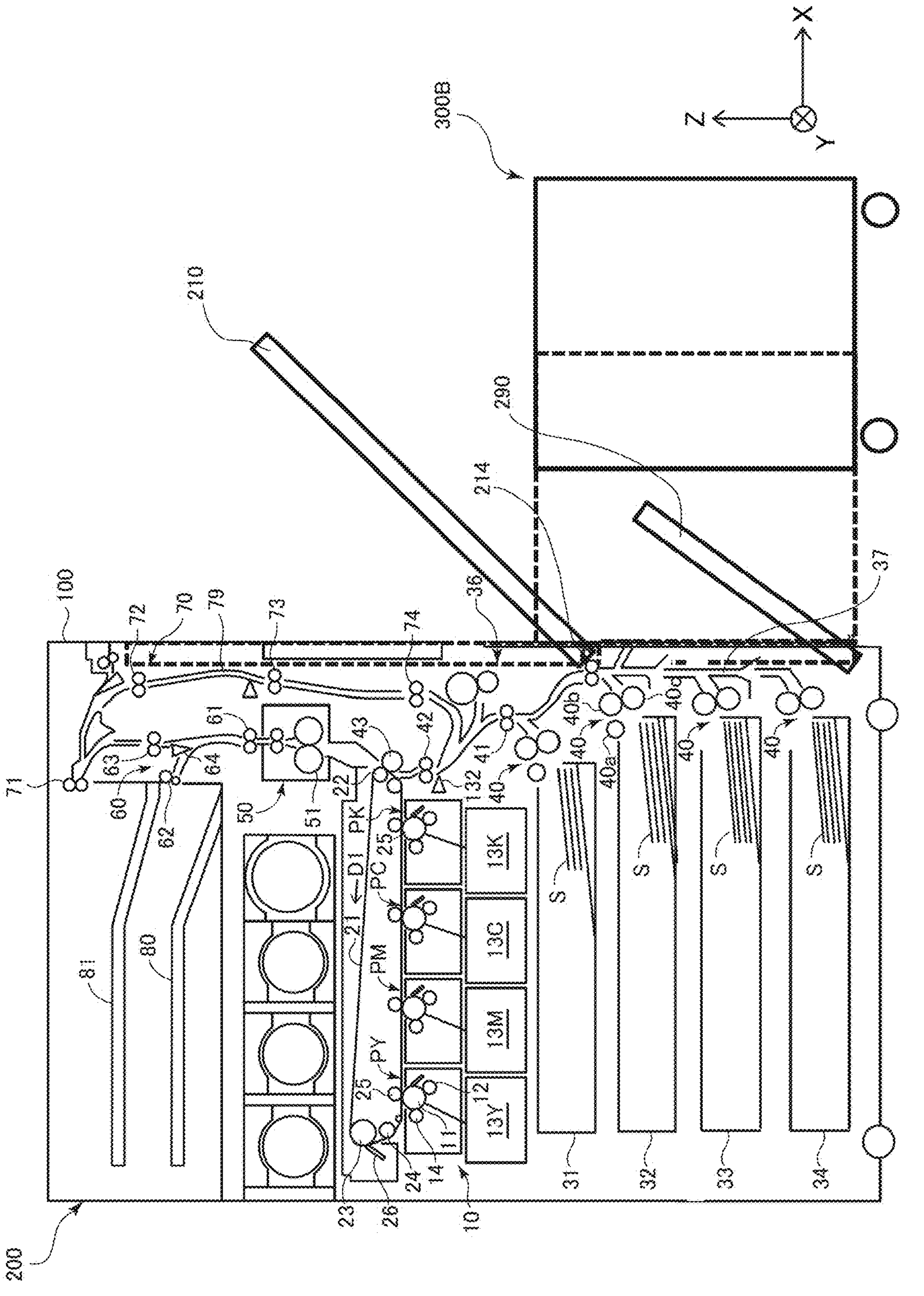
FIG. 3 is a schematic view illustrating a state in which a sheet feed deck serving as a comparative example is detached from the image forming apparatus.

Next, attachment of the image forming apparatus 200 to a sheet feed deck 300B serving as a comparative example will be described with reference to FIGS. 3 to 4D. FIG. 3 is a schematic view illustrating a state in which the sheet feed deck 300B serving as a comparative example is detached from the image forming apparatus 200. FIGS. 4A to 4D are each a schematic view illustrating a procedure for performing maintenance of an inside of the image forming apparatus.

As illustrated in FIG. 3, on a right side surface of the image forming apparatus 200 are disposed an upper door 210 and a lower door 290. The upper door 210 and the lower door 290 are each supported openably/closably with respect to the apparatus body 100. The upper door 210 is arranged above the lower door 290, and is configured pivotably about a pivot shaft 214. The pivot shaft 214 extends in the Y direction serving as an intersecting direction. When the lower door 290 is opened, a sheet feeding path 37 through which the sheet S fed by the sheet feed unit 40 is passed is opened. The user may open the lower door 290 to access the sheet feeding path 37 and perform maintenance, such as removing of jammed sheets from the sheet feeding path 37.

Further, when the upper door 210 is opened, the duplex conveyance path 79 is opened. By opening the upper door 210, the user may access the duplex conveyance path 79, and may perform maintenance such as removing of jammed sheets from the duplex conveyance path 79. Further, the apparatus body 100 may be configured to enable maintenance of the image forming engine 10 and the fixing unit 50 to be performed by opening the upper door 210.

The sheet feed deck 300B serving as a comparative example is attached to the right side surface of the image forming apparatus 200 in a state where the upper door 210 and the lower door 290 are closed, and locked to the image forming apparatus 200 by a locking member not shown. A position in which the sheet feed deck 300B is attached to the right side surface of the image forming apparatus 200 is referred to as an attachment position. Then, in a state where the locking by the locking member is released, the sheet feed deck 300B moves from the attachment position to the X direction serving as a detachment direction, and is detached from the image forming apparatus 200.

Figure 4A:
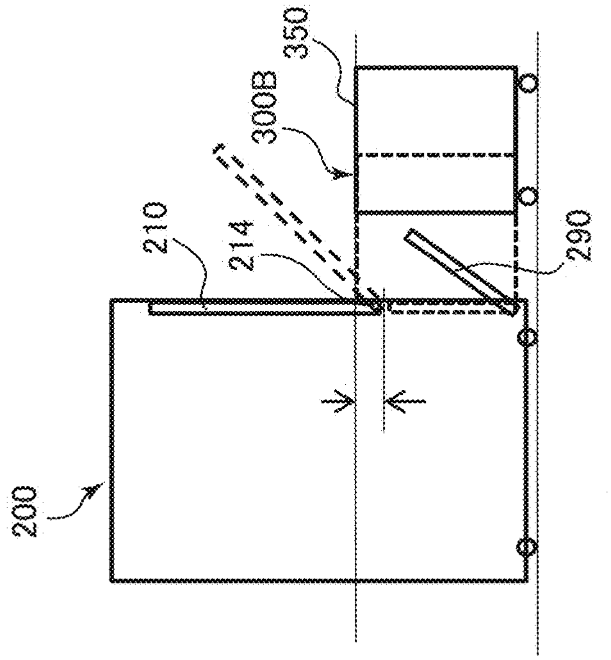
FIG. 4A is a schematic view illustrating a procedure for performing maintenance of an inside of the image forming apparatus.
Figure 4B:
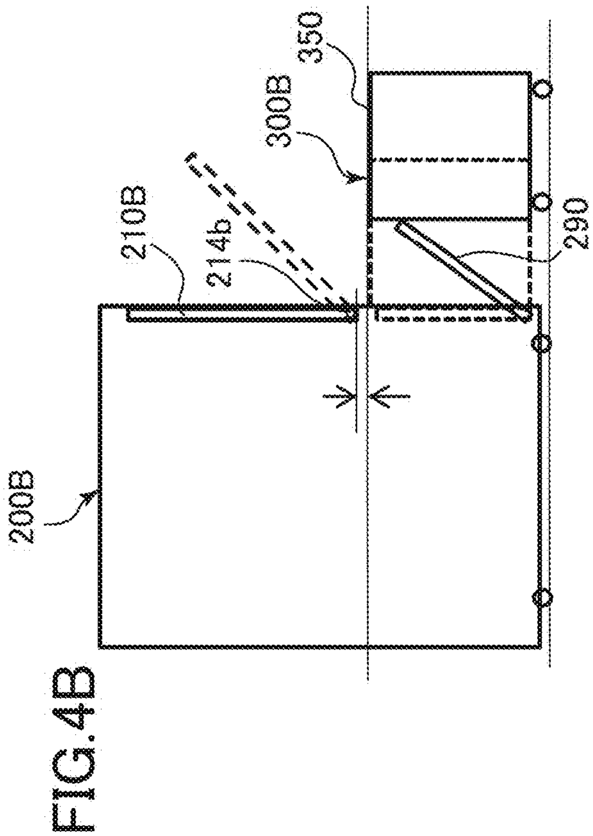
FIG. 4B is a schematic view illustrating a procedure for performing maintenance of an inside of the image forming apparatus.
Figure 4C:
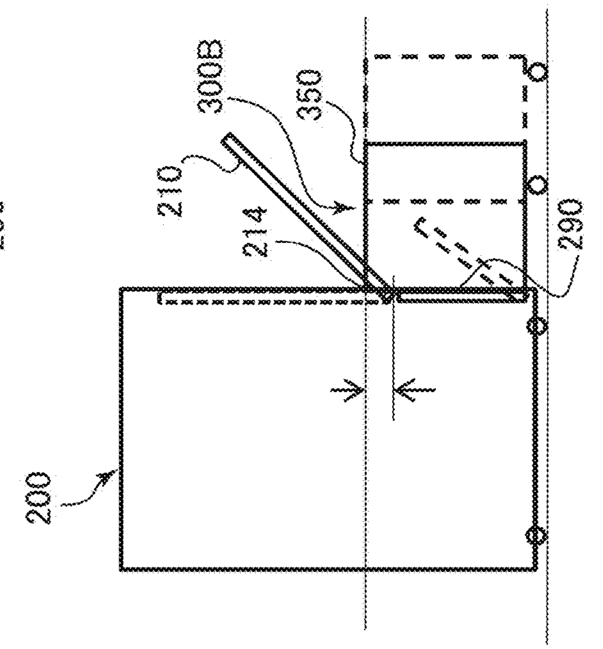
FIG. 4C is a schematic view illustrating a procedure for performing maintenance of an inside of the image forming apparatus.
Figure 4D:
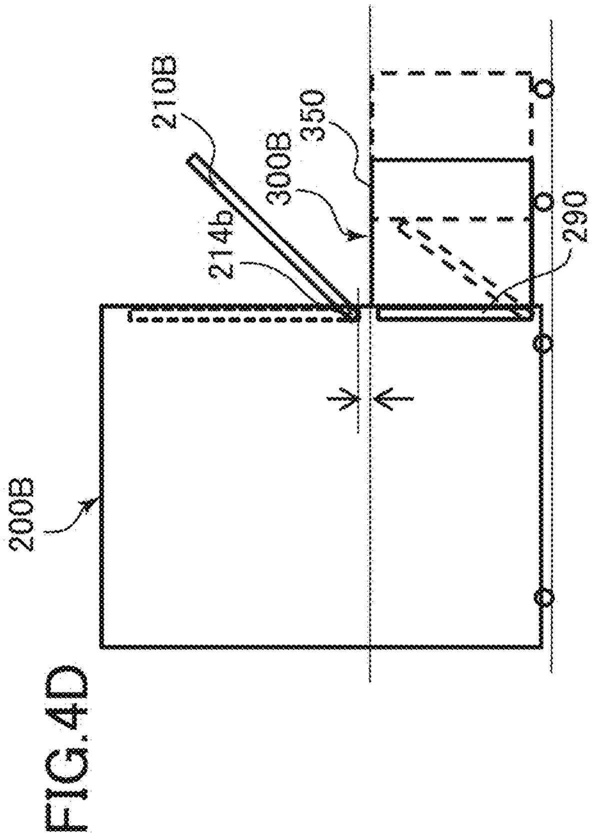
FIG. 4D is a schematic view illustrating a procedure for performing maintenance of an inside of the image forming apparatus.

FIGS. 4A and 4C are each a view illustrating the procedure of performing maintenance of the inside of the image forming apparatus 200. FIGS. 4B and 4D are each a view illustrating the procedure of performing maintenance of the inside of an image forming apparatus 200B. In FIGS. 4A and 4B, after moving the sheet feed deck 300B from the attachment position to the X direction, the upper door 210 (210B) is opened with an intention to access the inside of the image forming apparatus 200 (200B). In FIGS. 4C and 4D, after opening the upper door 210 (210B), the sheet feed deck 300B is moved from the attachment position to the X direction with the intention to access the inside of the image forming apparatus 200 (200B).

The image forming apparatus 200B has a similar function as the image forming apparatus 200, but differs in that a pivot shaft 214*b* of an upper door 210B of the image forming apparatus 200B is positioned above the pivot shaft 214 of the upper door 210 of the image forming apparatus 200. In further detail, the pivot shaft 214 of the image forming apparatus 200 is positioned lower than an upper surface 350 of the sheet feed deck 300B positioned at the attachment position. The pivot shaft 214*b* of the image forming apparatus 200B is positioned above the upper surface 350 of the sheet feed deck 300B positioned at the attachment position.

As illustrated in FIGS. 4B and 4D, the pivot shaft 214*b* of the upper door 210B of the image forming apparatus 200B having a relatively large size is positioned above the upper surface 350 of the sheet feed deck 300B positioned at the attachment position. Therefore, as illustrated in FIG. 4D, the upper door 210B and the sheet feed deck 300B do not interfere with each other even if the upper door 210B is opened before detaching the sheet feed deck 300B from the attachment position to an arrow X direction. Further, as illustrated in FIG. 4B, even if the upper door 210B is opened after detaching the sheet feed deck 300B from the attachment position to the arrow X direction, similarly, the upper door 210B and the sheet feed deck 300B do not interfere with each other. Therefore, regarding the image forming apparatus 200B, the order in which the opening operation of the upper door 210B and the detachment operation of the sheet feed deck 300B are performed is not specifically limited.

Meanwhile, as illustrated in FIGS. 4A and 4C, the pivot shaft 214 of the upper door 210 of the image forming apparatus 200 having a small size is positioned below the upper surface 350 of the sheet feed deck 300B positioned at the attachment position. Therefore, as illustrated in FIG. 4A, no problem occurs in a case where the upper door 210 is opened after the sheet feed deck 300B has been detached from the attachment position to the arrow X direction, but in the procedure illustrated in FIG. 4C, a problem arises. That is, as illustrated in FIG. 4C, if the upper door 210 is opened before detaching the sheet feed deck 300B from the attachment position to the arrow X direction, the upper door 210 and the sheet feed deck 300B interfere with each other. In this state, since the sheet feed deck 300B is locked to the image forming apparatus 200 by a locking member not shown, the upper door 210 cannot be opened, and if one attempts to open the upper door 210 forcibly, the circumference of the upper door 210 or the pivot shaft 214 may be damaged. As described, in a case where the pivot shaft 214 is positioned below the upper surface 350 of the sheet feed deck 300B, the procedure of performing maintenance of the inside of the image forming apparatus 200 had been limited.

Sheet Feed Deck

Figure 5A:
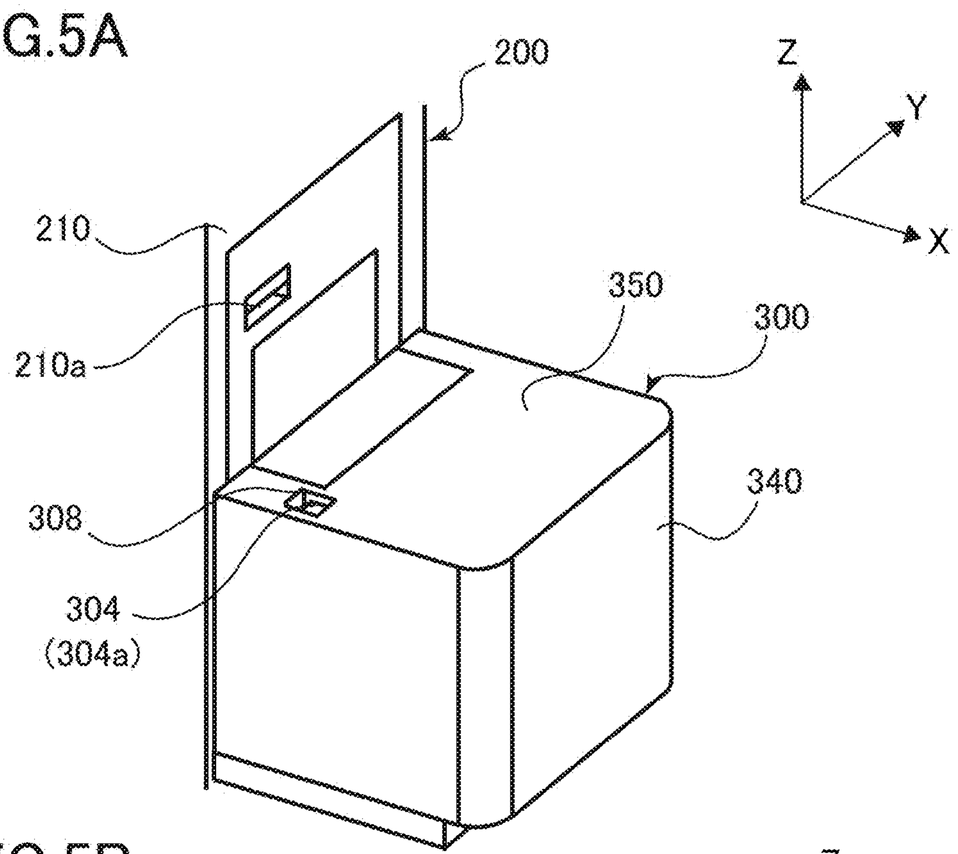
FIG. 5A is a perspective view illustrating a sheet feed deck attached to the image forming apparatus.

Next, the sheet feed deck 300 according to the present embodiment will be described with reference to FIGS. 1, 5A, and 5B. FIG. 5A is a perspective view illustrating the sheet feed deck 300 attached to the image forming apparatus 200, and FIG. 5B is a perspective view illustrating a state in which the sheet feed deck 300 is detached from the image forming apparatus 200.

As illustrated in FIG. 5A, on the right side surface of the image forming apparatus 200 is detachably connected the sheet feed deck 300 serving as a sheet conveyance apparatus. The sheet feed deck 300 is a product that is additionally installed by the user for performing printing of a large amount of sheets of a specific size, such as A4 size, and for example, approximately 3,000 sheets of normal paper may be stacked therein. The sheet feed deck 300 may be adopted as a common product that may be used with multiple types of image forming apparatuses, and for example, it may be attached both to the image forming apparatus 200 which is inexpensive and which has a small size, as illustrated in FIG. 4C, and to the image forming apparatus 200B serving as a mid-level device, as illustrated in FIG. 4D.

Figure 5B:
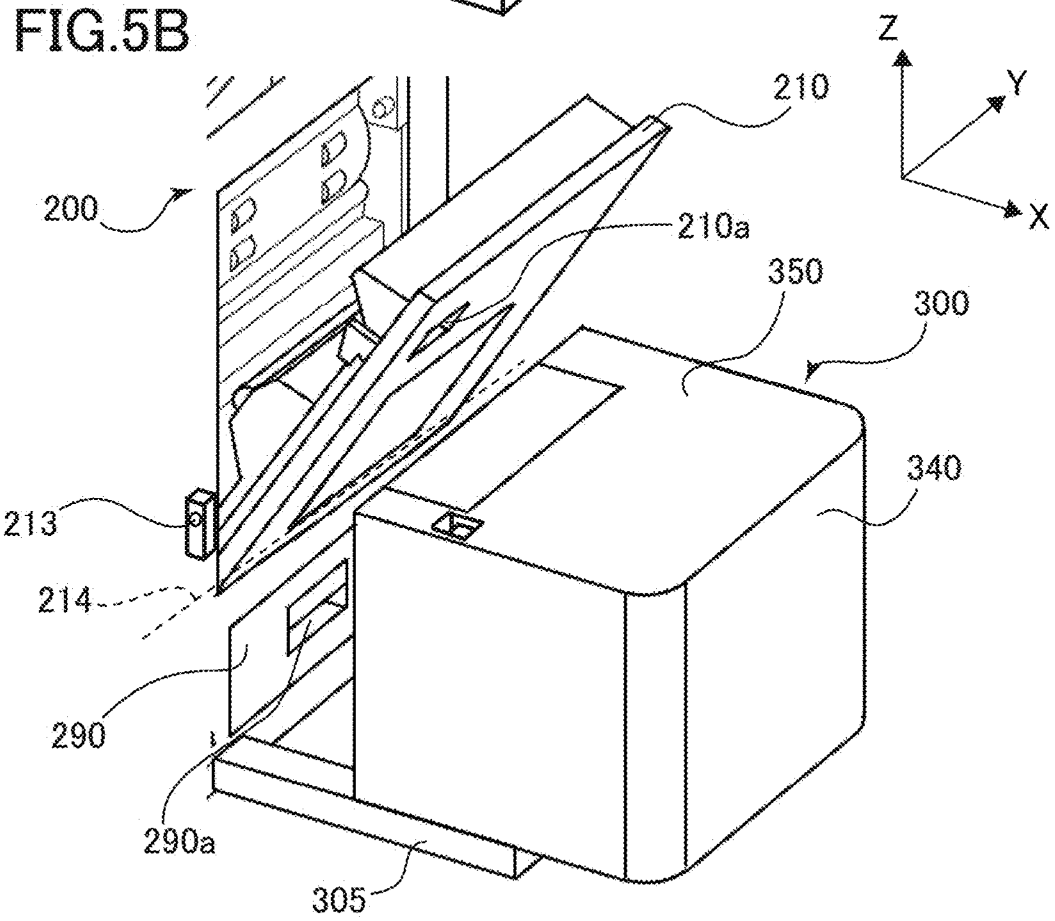
FIG. 5B is a perspective view illustrating a state in which the sheet feed deck is detached from the image forming apparatus.

A deck rail 305 is detachably attached to the image forming apparatus 200, as illustrated in FIG. 5B. The deck rail 305 is arranged along an installation surface of the image forming apparatus 200, and extends downstream of the image forming apparatus 200 in the X direction. The sheet feed deck 300 is guided movably in the X direction by the deck rail 305. In a state where the sheet feed deck 300 has moved in the X direction from the attachment position, the upper door 210 and the lower door 290 may be opened. Grip portions 210*a* and 290*a* that the user may grip when opening and closing the upper door 210 and the lower door 290 are provided on the upper door 210 and the lower door 290. In the present embodiment, the pivot shaft 214 of the upper door 210 is positioned below the upper surface 350 of the sheet feed deck 300.

The sheet feed deck 300 includes the upper surface 350, as illustrated in FIG. 1, and has a casing 340 facing the image forming apparatus 200, a storage chamber 301, a pickup roller 302, a separation roller pair 302*a*, and a conveyance roller pair 303 accommodated in the casing 340. The storage chamber 301 serving as a sheet accommodating portion accommodates the sheets S. The sheets S accommodated in the storage chamber 301 are fed by the pickup roller 302 serving as a feeding portion, and are separated one by one by the separation roller pair 302*a*. The sheets S separated one by one by the separation roller pair 302*a* are conveyed by the conveyance roller pair 303 serving as a conveyance portion toward the sheet feeding path 37 of the image forming apparatus 200.

Lock Mechanism

Figure 6A:
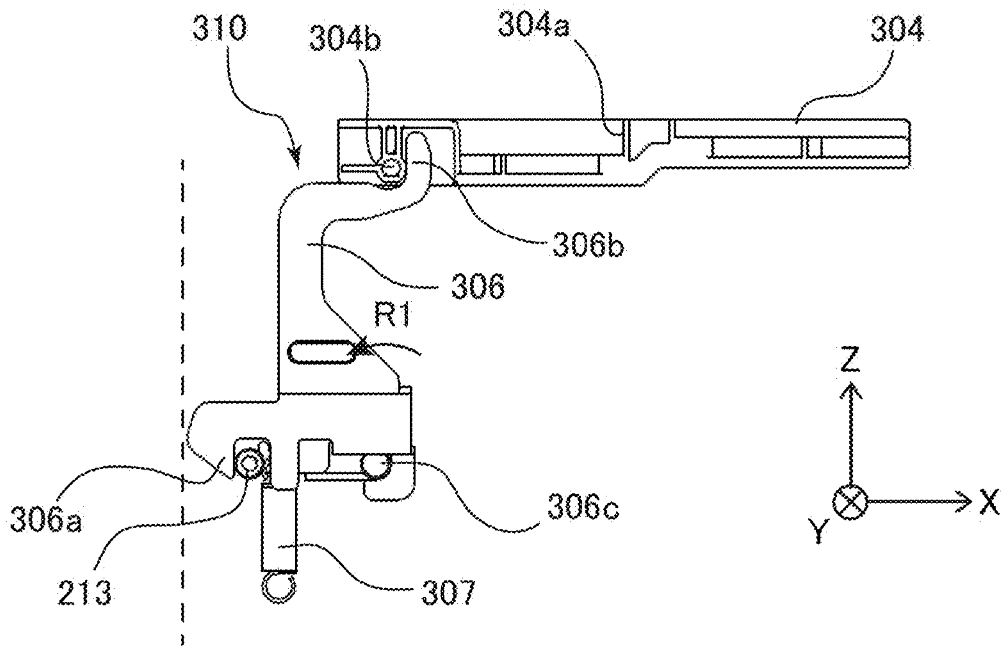
FIG. 6A is a cross-sectional view of a lock mechanism positioned at a lock position.
Figure 6B:
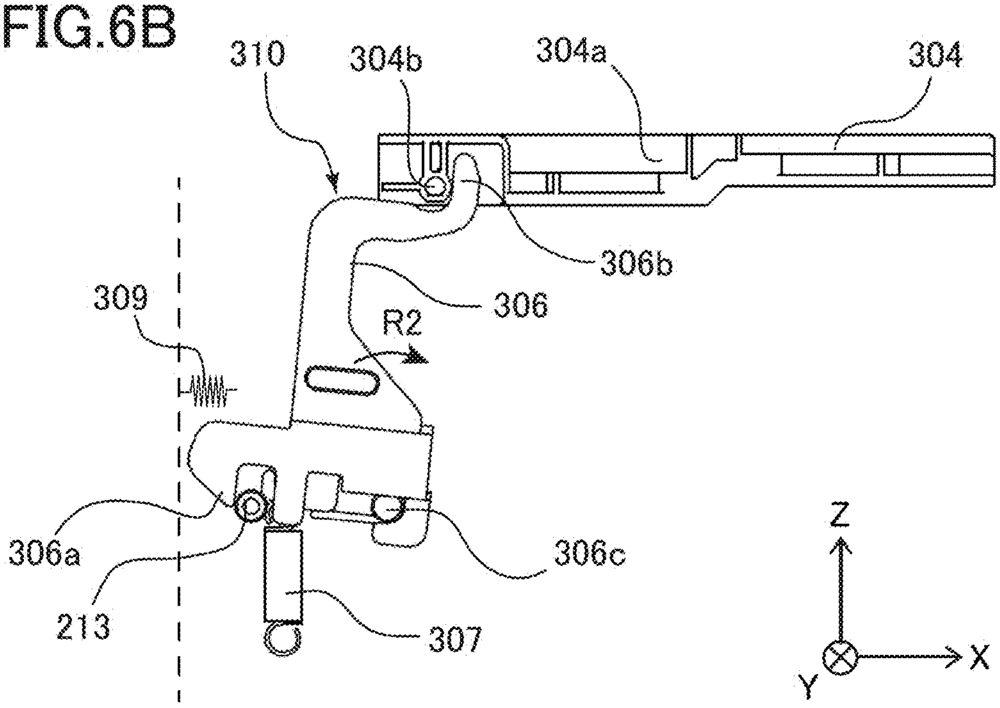
FIG. 6B is a cross-sectional view of the lock mechanism being moved from the lock position toward a release position.

Next, a lock mechanism 310 disposed on the sheet feed deck 300 will be described with reference to FIGS. 6A and 6B. FIG. 6A is a cross-sectional view illustrating the lock mechanism 310 positioned at a lock position, and FIG. 6B is a cross-sectional view illustrating the lock mechanism 310 moving from the lock position toward a release position.

The sheet feed deck 300 is provided with the lock mechanism 310 serving as a lock portion, as illustrated in FIG. 6A. The lock mechanism 310 includes a hook 306 serving as a pivot member, a hook spring 307, and a deck release switch 304 serving as an interlock member. The hook 306 is supported pivotably about a hook shaft 306*c* with respect to the casing 340 (refer to FIG. 1), and is urged in an arrow R1 direction by the hook spring 307. Further, the hook 306 includes an engagement portion 306*a* engageable with a fixed shaft 213 (refer to FIG. 5) provided on the image forming apparatus 200, and a contact portion 306*b*.

The deck release switch 304 is supported movably in the X direction with respect to the casing 340 (refer to FIG. 1) by a rail not shown. The deck release switch 304 includes a contact portion 304*b* capable of coming into contact with the contact portion 306*b* of the hook 306, and an operation surface 304*a*. As illustrated in FIG. 5B, an opening portion 308 is provided on the upper surface 350 of the casing 340, and the operation surface 304*a* is exposed to the exterior of the sheet feed deck 300 via the opening portion 308. That is, the opening portion 308 exposes the operation surface 304*a* serving as a portion of the lock mechanism 310 to the exterior.

In a state where the casing 340 of the sheet feed deck 300 and the image forming apparatus 200 are locked by the lock mechanism 310, the lock mechanism 310 is positioned at a lock position illustrated in FIG. 6A. In this state, the contact portion 304*b* of the deck release switch 304 comes into contact with the contact portion 306*b* of the hook 306, and the engagement portion 306*a* of the hook 306 is engaged with the fixed shaft 213.

When releasing the lock between the sheet feed deck 300 and the image forming apparatus 200 by the lock mechanism 310, the user accesses the operation surface 304*a* of the deck release switch 304 via the opening portion 308. Then, as illustrated in FIG. 6B, the user slides the deck release switch 304 in the X direction by pressing the operation surface 304*a* in the X direction. Then, the contact portion 304*b* of the deck release switch 304 presses the contact portion 306*b* of the hook 306 in the X direction.

Thereby, as illustrated in FIG. 6B, the hook 306 pivots about the hook shaft 306*c* in an arrow R2 direction opposite to the arrow R1 direction against the urging force of the hook spring 307. By having the hook 306 pivot in the arrow R2 direction, the engagement portion 306*a* of the hook 306 moves in a direction separating from the fixed shaft 213 of the image forming apparatus 200. In a state where the engagement between the engagement portion 306*a* of the hook 306 and the fixed shaft 213 is released, the locking of the casing 340 of the sheet feed deck 300 and the image forming apparatus 200 is released. The position of the lock mechanism 310 in this state is referred to as a release position.

In a state where the lock mechanism 310 is positioned at the release position and the locking of the casing 340 of the sheet feed deck 300 and the image forming apparatus 200 is released, the sheet feed deck 300 is moved in the X direction with respect to the image forming apparatus 200 by an urging force of a separation spring 309 disposed on the sheet feed deck 300. Then, the sheet feed deck 300 is guided by the deck rail 305 to a separation position separated for a predetermined distance in the X direction from the image forming apparatus 200.

As described above, the sheet feed deck 300 serves as a common product for a lineup of a variety of image forming apparatuses, and in some cases, the position of the upper surface 350 of the casing 340 may be positioned above the pivot shaft 214 of the upper door 210 according to the size of the image forming apparatus to which the sheet feed deck 300 is attached. As illustrated in FIGS. 4C and 5B, the upper surface 350 of the casing 340 of the sheet feed deck 300 is positioned above the pivot shaft 214 of the upper door 210 of the image forming apparatus 200 according to the present embodiment.

According to such a positional relationship, upon performing maintenance of the inside of the image forming apparatus 200, even if an instruction regarding the procedure of operation is notified on a screen of the operation portion 202 or through an operation manual, the user may not notice the instruction and open the upper door 210 prior to moving the sheet feed deck 300. Therefore, there is a demand for the sheet feed deck 300 in which the order of opening operation of the upper door 210 and the detachment operation of the sheet feed deck 300 are not limited. According to the present embodiment, an interlock separating mechanism 320 described later is attached to the upper surface 350 of the sheet feed deck 300.

Interlock Separating Mechanism

Figure 7:
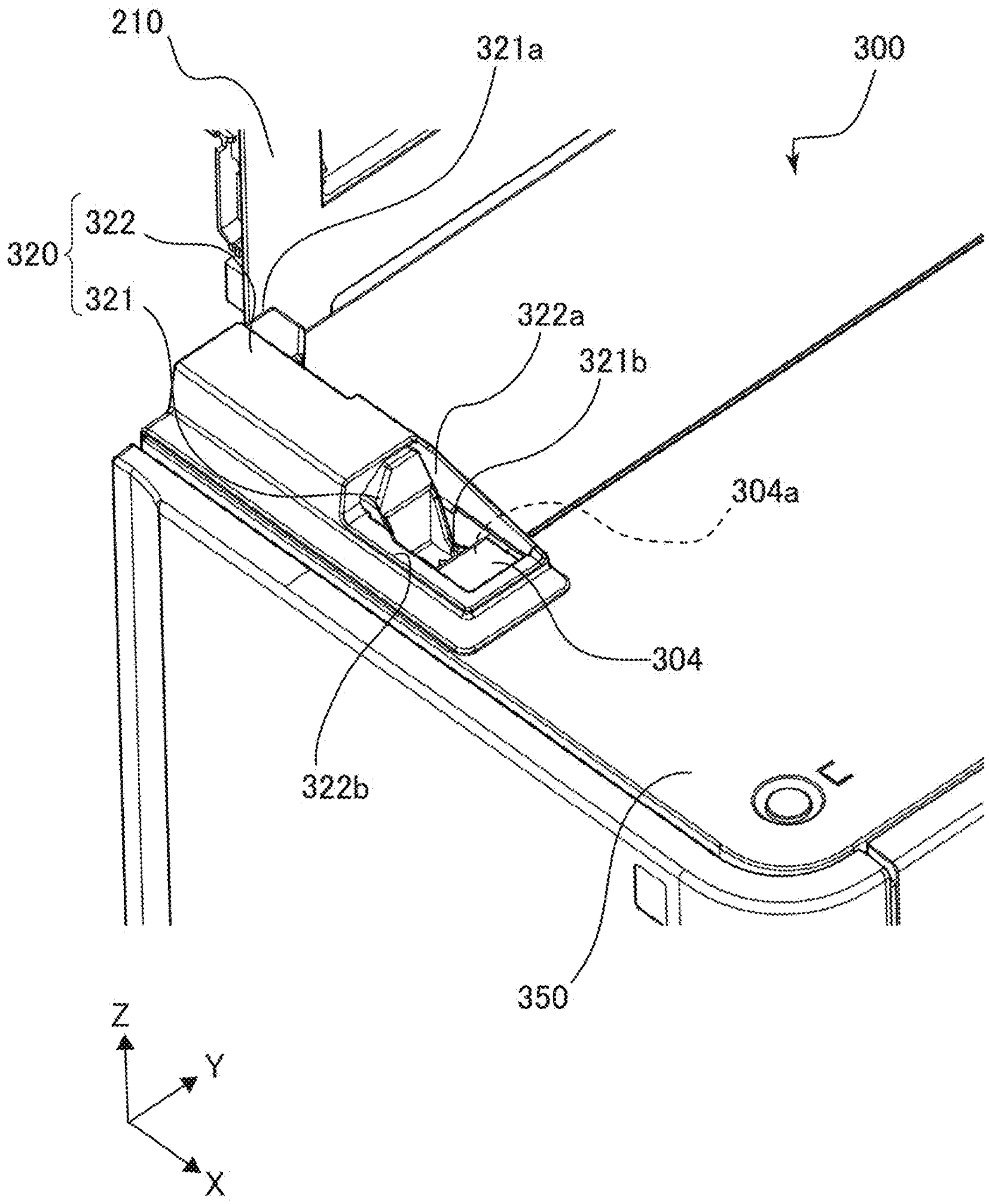
FIG. 7 is a perspective view illustrating an interlock separating mechanism attached to the sheet feed deck.
Figure 8A:
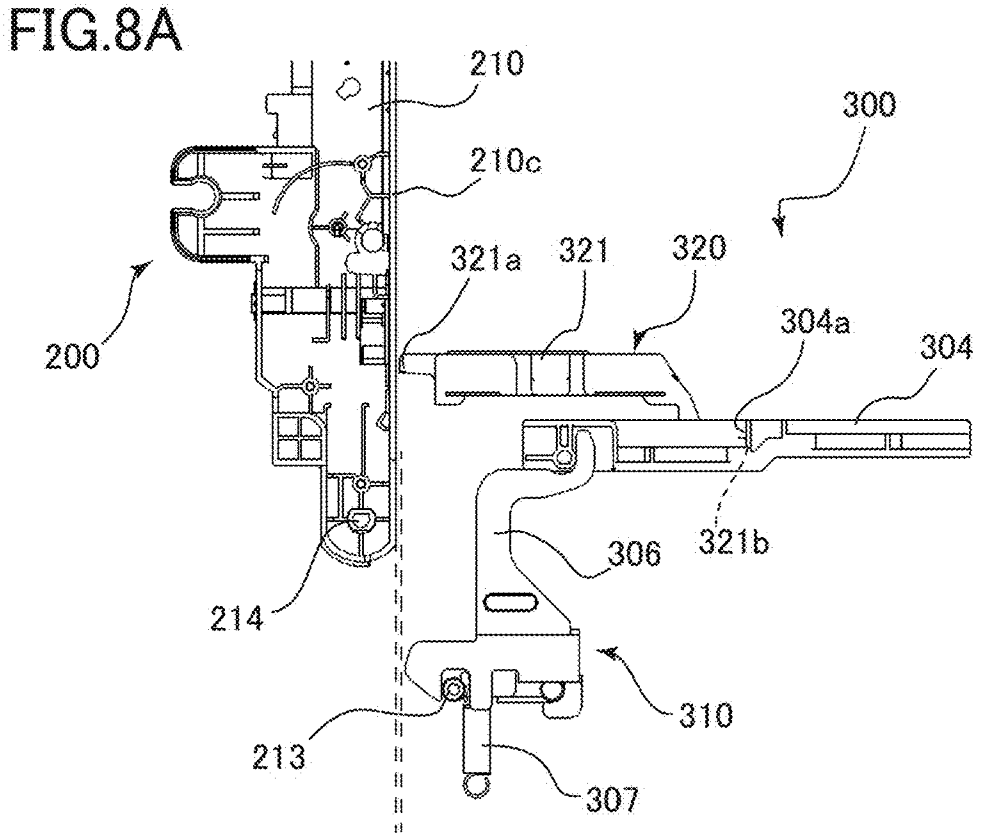
FIG. 8A is a cross-sectional view illustrating the lock mechanism and an interlock separating mechanism in a state where an upper door is closed.
Figure 8B:
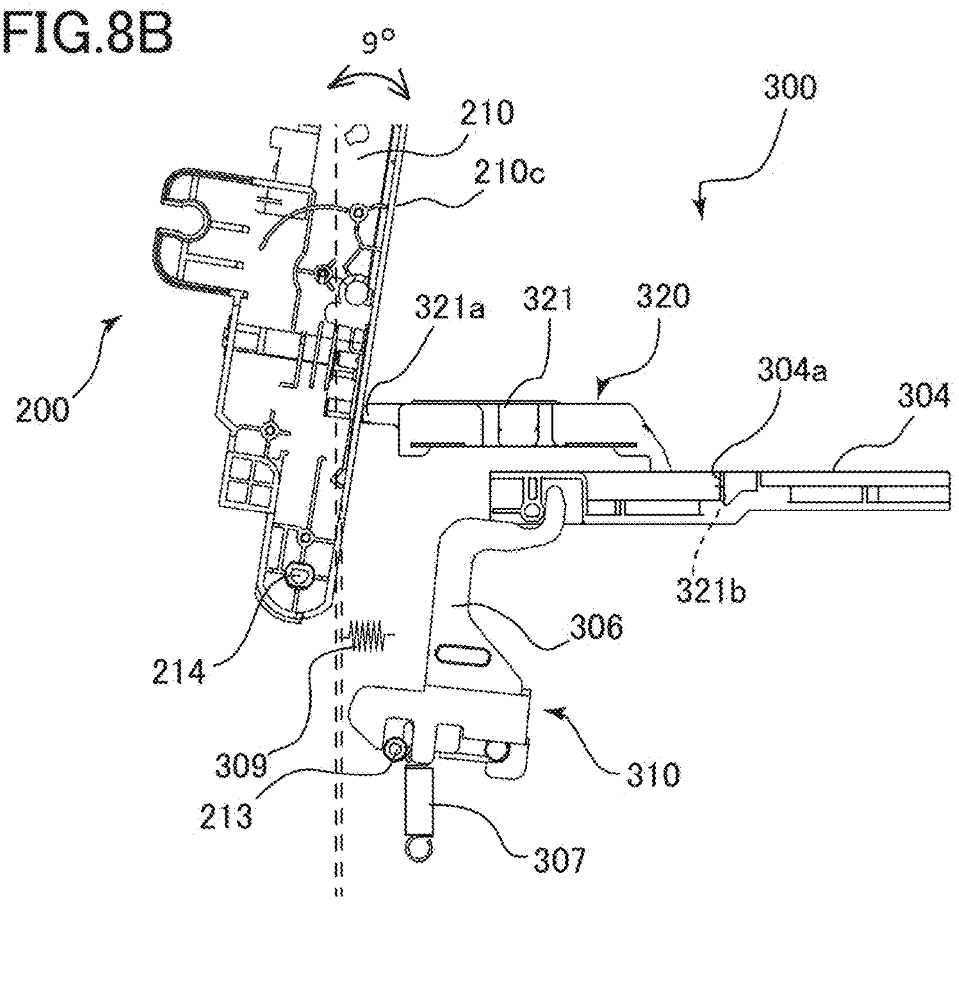
FIG. 8B is a cross-sectional view illustrating the lock mechanism and the interlock separating mechanism in a state where the upper door is opened.
Figure 9A:
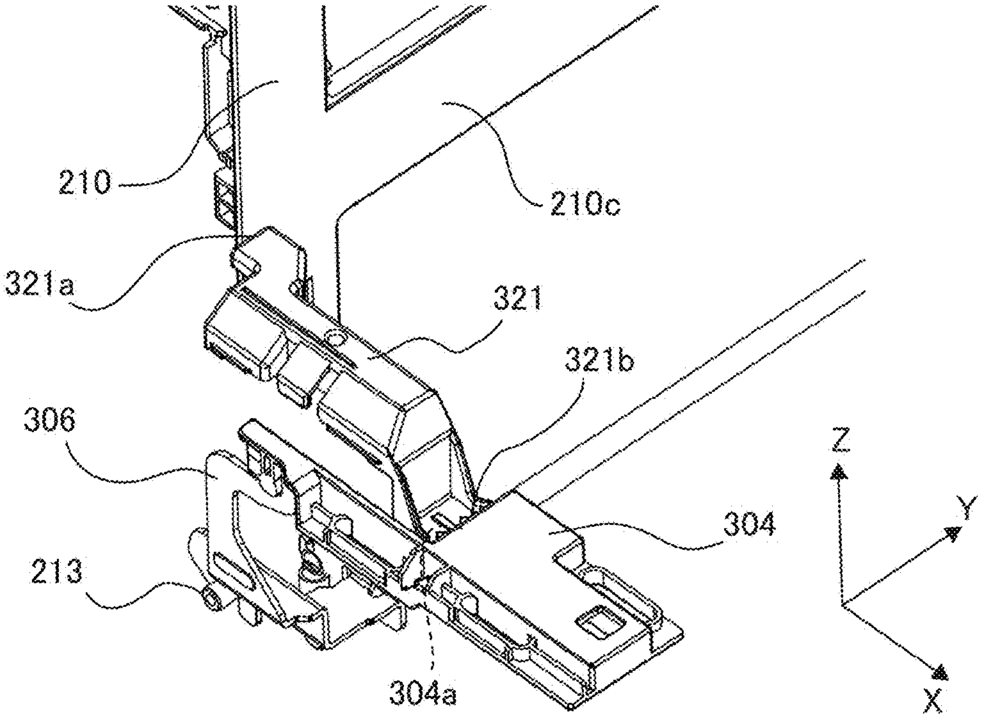
FIG. 9A is a perspective view illustrating the lock mechanism and the interlock separating mechanism in a state where the upper door is closed.
Figure 9B:
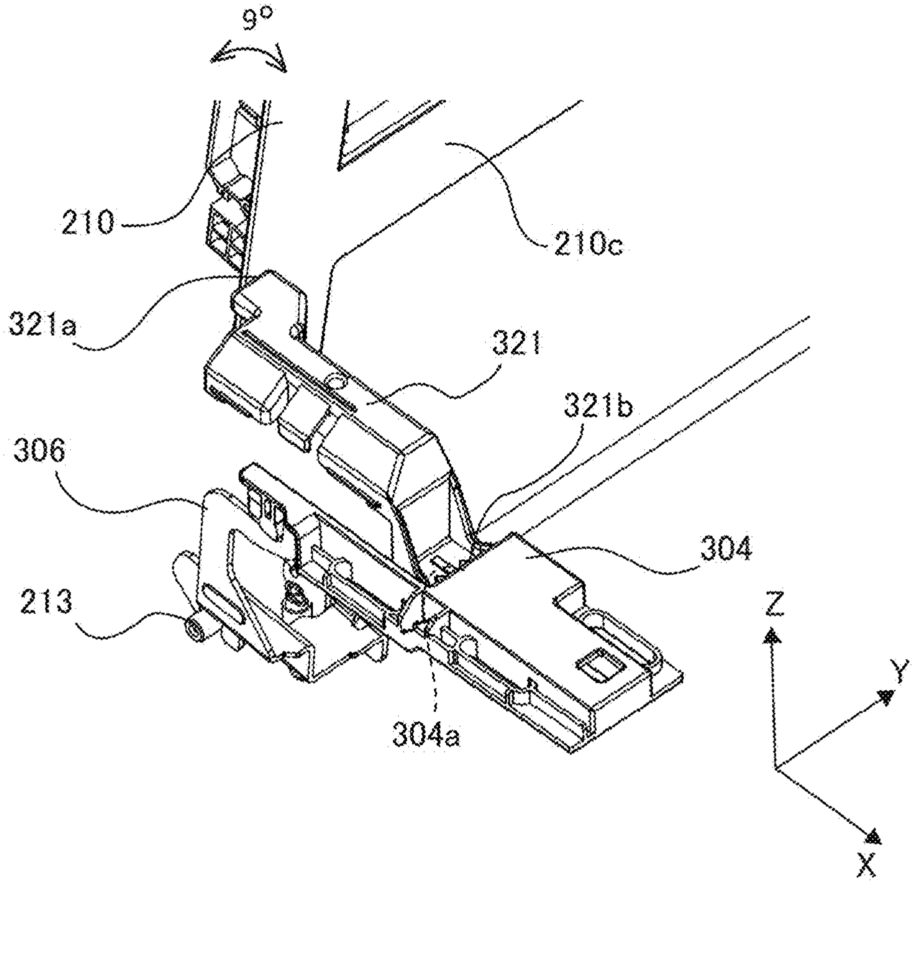
FIG. 9B is a perspective view illustrating the lock mechanism and the interlock separating mechanism in a state where the upper door is opened.

Next, the interlock separating mechanism 320 will be described with reference to FIGS. 7 to 9B. FIG. 7 is a perspective view of the interlock separating mechanism 320 attached to the sheet feed deck 300. FIG. 8A is a cross-sectional view of the lock mechanism 310 and the interlock separating mechanism 320 in a state where the upper door 210 is closed, and FIG. 8B is a cross-sectional view of the lock mechanism 310 and the interlock separating mechanism 320 in a state where the upper door 210 is opened. FIG. 9A is a perspective view of the lock mechanism 310 and the interlock separating mechanism 320 in a state where the upper door 210 is closed, and FIG. 9B is a perspective view of the lock mechanism 310 and the interlock separating mechanism 320 in a state where the upper door 210 is opened. In FIGS. 8A to 9B, a slider cover 322 is not shown.

The interlock separating mechanism 320 is an optional mechanism detachably attached to the sheet feed deck 300. The interlock separating mechanism 320 includes the slider cover 322 that is fixed by a screw not shown to the upper surface 350 of the casing 340 of the sheet feed deck 300, and a separation slider 321 supported movably on a slider rail 322*a* formed on an inner side surface of the slider cover 322. The slider cover 322 may also be attached to the casing 340 by a double-sided tape. The separation slider 321 is configured movably in the X direction by the slider rail 322*a* of the slider cover 322. That is, the separation slider 321 serving as a moving member is supported slidably in the X direction on the casing 340 via the slider cover 322.

An opening portion 322*b* opening upward is provided on the slider cover 322, and the operation surface 304*a* of the deck release switch 304 is exposed to the outside of the sheet feed deck 300 via the opening portion 322*b*. That is, the slider cover 322 is fixed to the upper surface 350 such that the operation surface 304*a* of the deck release switch 304 may be operated through the opening portion 322*b*.

As illustrated in FIGS. 7 and 8A, the separation slider 321 includes a door contact surface 321*a* at a first end portion in the X direction, and a switch contact surface 321*b* at a second end portion in the X direction. In a state where the interlock separating mechanism 320 is attached to the sheet feed deck 300, the door contact surface 321*a* faces the upper door 210 in the X direction, and the switch contact surface 321*b* faces the operation surface 304*a* of the deck release switch 304 in the X direction. That is, the deck release switch 304 is disposed in a manner capable of coming into contact with the separation slider 321. Further, the door contact surface 321*a* serving as a pressed portion is positioned above the pivot shaft 214 of the upper door 210. In a state where the upper door 210 is closed, the door contact surface 321*a* faces the upper door 210 with a narrow gap formed therebetween, but alternatively, the door contact surface 321*a* may be disposed to come into contact with the upper door 210. Similarly, in a state where the upper door 210 is closed, the switch contact surface 321*b* faces the upper door 210 with a narrow gap formed therebetween, but alternatively, the switch contact surface 321*b* may be disposed to come into contact with the upper door 210.

Next, an operation of the interlock separating mechanism 320 will be described with reference to FIGS. 8A to 9B. As illustrated in FIGS. 8A and 9A, the sheet feed deck 300 is attached at the attachment position to the right side surface of the image forming apparatus 200, and locked to the image forming apparatus 200 by the lock mechanism 310 positioned at the lock position. In this state, when the upper door 210 is opened, the door contact surface 321*a* of the separation slider 321 is pressed by an exterior surface 210*c* of the upper door 210. According to the present embodiment, as illustrated in FIGS. 8B and 9B, the exterior surface 210*c* of the upper door 210 and the door contact surface 321*a* come into contact with each other at a position where the upper door 210 is opened for 9° from the closed position. In the following description, an opening angle of the upper door 210 from the closed position is referred to as an opening angle.

A force F in a normal direction of the exterior surface 210*c* acts on the door contact surface 321*a* from the exterior surface 210*c* of the upper door 210. Since the opening angle of the upper door 210 when the exterior surface 210*c* and the door contact surface 321*a* come into contact with each other is 9°, a force Fx, which is an X direction component of the force F, is F×cos 9°. Since cos 9° is approximately 0.99, the force Fx is approximately 99% of the force F, and acts on the separation slider 321.

Therefore, the separation slider 321 slidably moves smoothly in the X direction by the force Fx from the exterior surface 210*c* of the upper door 210. When the separation slider 321 moves in sliding motion in the X direction, the switch contact surface 321*b* of the separation slider 321 presses the operation surface 304*a* of the deck release switch 304 in the X direction. Thereby, as described above, similar to a state where the user presses the operation surface 304*a* in the X direction, the deck release switch 304 moves in sliding motion in the X direction. That is, the deck release switch 304 moves in the X direction, which is the same direction as the separation slider 321, and the lock mechanism 310 moves from the lock position to the release position. In other words, by being pressed by the upper door 210, the separation slider 321 moves so as to move the lock mechanism 310 from the lock position to the release position in a state where the casing 340 is not moved with respect to the image forming apparatus 200. Then, the locking of the casing 340 of the sheet feed deck 300 and the image forming apparatus 200 is released.

When the locking of the casing 340 of the sheet feed deck 300 and the image forming apparatus 200 is released, the sheet feed deck 300 moves in the X direction with respect to the image forming apparatus 200 by the urging force of the separation spring 309 serving as an urging member disposed on the sheet feed deck 300.

As described, according to the present embodiment, the interlock separating mechanism 320 is attached as an optional mechanism to the upper surface 350 of the sheet feed deck 300. Since the upper surface 350 is positioned above the pivot shaft 214 of the upper door 210, if the interlock separating mechanism 320 is not attached, even if the user attempts to open the upper door 210, the upper door 210 will interfere with the casing 340 of the sheet feed deck 300 and cannot be opened.

However, since the interlock separating mechanism 320 is attached to the upper surface 350, by opening the upper door 210, the deck release switch 304 of the lock mechanism 310 will be moved in sliding motion in the X direction via the separation slider 321. That is, the lock mechanism 310 moves from the lock position to the separation position in linkage with the opening operation of the upper door 210. If the locking of the sheet feed deck 300 to the image forming apparatus 200 by the lock mechanism 310 is released, the sheet feed deck 300 is detached, or moved, automatically from the image forming apparatus 200 in the X direction by the urging force of the separation spring 309, and moves to a predetermined separation position.

Now, when the upper door 210 is opened to release the lock of the lock mechanism 310, the casing 340 of the sheet feed deck 300 is not moved with respect to the image forming apparatus 200. Therefore, the operating force that the user applies to open the upper door 210 is mostly used for moving the lock mechanism 310 from the lock position to the separation position. Therefore, it becomes possible to reduce the operating force that the user must apply to detach the sheet feed deck 300 from the image forming apparatus 200.

Further, in a state where the locking by the lock mechanism 310 to the image forming apparatus 200 is released, the sheet feed deck 300 is moved in the X direction by the urging force of the separation spring 309, such that the user does not have to hold and move the sheet feed deck 300 in the X direction. Therefore, the usability may be enhanced.

Moreover, when performing maintenance of the inside of the image forming apparatus 200, the user can move the lock mechanism 310 to the release position, either by operating the separation slider 321 via the opening portion 322*b* of the slider cover 322 or by opening the upper door 210. In other words, the user can open the upper door 210 either before or after moving the lock mechanism 310 to the release position. Therefore, the order in which the maintenance operation is performed for performing maintenance of the inside of the image forming apparatus 200 will not be limited, and the user will not be confused by the operation order, such that the maintenance property may be enhanced. Moreover, if the user wishes to detach the sheet feed deck 300 from the image forming apparatus 200 without opening the upper door 210, the separation slider 321 may be operated individually, such that the usability may be enhanced.

Further, since the lock mechanism 310 moves from the lock position to the release position in linkage with the opening operation of the upper door 210, the damaging of the upper door 210 or the casing 340 may be suppressed.

It may be possible to provide the interlock separating mechanism 320 as a component that is packed together with the sheet feed deck 300, and for example, in a case where the sheet feed deck 300 is connected to the image forming apparatus 200 having a small size as illustrated in FIGS. 4A and 4C, the interlock separating mechanism 320 may be attached to the sheet feed deck 300. In a case where the sheet feed deck 300 is connected to the image forming apparatus 200B having a large size as illustrated in FIGS. 4B and 4D, the interlock separating mechanism 320 is not necessarily attached to the sheet feed deck 300.

Other Embodiments

The present embodiment has been illustrated based on an example in which the sheet feed deck 300 is locked to or detached from the image forming apparatus 200, but the present technique is not limited thereto. For example, the lock mechanism 310 and the interlock separating mechanism 320 may be applied not only to the sheet feed deck 300 but to other apparatuses. That is, if a configuration includes a first unit and a second unit connected to the first unit, the first unit includes a door member, such as the upper door 210, and the second unit includes the lock mechanism 310 and the interlock separating mechanism 320 described above. Such first and second units are not specifically limited, except that the second unit has a function to convey sheets. The second unit can be, for example, the sheet feed deck as according to the present embodiment, an image reading apparatus for reading images on sheets, or a post-processing apparatus, i.e., finisher, that performs postprocessing to the sheets on which the image has been formed. The first unit is not limited to the image forming apparatus as according to the present embodiment, and it is not required to be provided with a function to form an image on a sheet.

Further according to the present embodiment, the lock mechanism 310 includes the hook 306, the hook spring 307, and the deck release switch 304, but the present technique is not limited thereto. For example, other members may be interposed between the hook 306 and the deck release switch 304.

According even further to the present embodiment, the separation slider 321 is configured slidably in the X direction, but the present technique is not limited thereto. For example, the separation slider 321 may be configured slidably in a direction intersecting the X direction, or it may be configured pivotably about a pivot shaft that extends in the Y direction.

According to the present embodiment, the upper door 210 is configured pivotably about the pivot shaft 214 that extends in the Y direction, but the present technique is not limited thereto. For example, the upper door 210 is configured pivotably about the pivot shaft that extends in the Z direction. The direction of movement of the separation slider 321 and the deck release switch 304 may be changed according to the pivoting direction of the upper door 210.

According to the present embodiment, the exterior surface 210*c* of the upper door 210 and the door contact surface 321*a* of the separation slider 321 come into contact with each other when the opening and of the upper door 210 becomes 9°, but the present technique is not limited thereto. The opening angle of the upper door 210 in a state where the exterior surface 210*c* of the upper door 210 and the door contact surface 321*a* of the separation slider 321 come into contact with each other may be set arbitrarily.

According to the present embodiment, the opening portion 308 disposed on the upper surface 350 of the casing 340 is configured such that the operation surface 304*a* of the deck release switch 304 is exposed to the exterior, but the present technique is not limited thereto. The opening portion 308 should merely be configured to expose at least a portion of the lock mechanism 310 to the exterior. That is, the opening portion 308 should merely be designed to allow the user to access the lock mechanism 310.

According to the present embodiment, the deck release switch 304 is configured to move in the X direction, which is the same direction as the separation slider 321, but the present technique is not limited thereto. For example, the deck release switch 304 may move in the direction intersecting the X direction by being pushed by the separation slider 321.

According to the present embodiment, the sheet feed deck 300 connected to the image forming apparatus 200 adopting an electrophotographic system has been described as an example, but the present disclosure is not limited thereto. For example, the sheet feed deck 300 may be connected to an inkjet-type image forming apparatus in which an image is formed on a sheet by discharging ink through nozzles.

The present disclosure enables to reduce the operating force for detaching the sheet conveyance apparatus from the door unit.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-112788, filed Jul. 12, 2024, which is hereby incorporated by reference herein in its entirety.

What is claimed is:

1. A sheet conveyance apparatus configured to be detachably connected to a door unit including a door member configured to be opened and closed, the sheet conveyance apparatus comprising:

a conveyance portion configured to convey a sheet;

a casing configured to accommodate the conveyance portion to face the door unit;

a lock portion supported movably with respect to the casing to a lock position where the lock portion locks the casing to the door unit and to a release position where the lock portion releases a lock between the casing and the door unit; and a moving member supported movably by the casing, the moving member being configured to move the lock portion from the lock position to the release position by being pressed by the door member being opened in a state where the casing is not moved with respect to the door unit.

2. The sheet conveyance apparatus according to claim 1, wherein the moving member is supported slidably by the casing.

3. The sheet conveyance apparatus according to claim 2, wherein the sheet conveyance apparatus is configured to be detached from the door unit in a detachment direction, and wherein the moving member slidably moves in the detachment direction by being pressed by the door member, the door member being configured to pivot about a pivot shaft extending in an intersecting direction intersecting the detachment direction.

4. The sheet conveyance apparatus according to claim 3, wherein the moving member includes a pressed portion configured to be pressed by the door member being opened downward about the pivot shaft, and wherein the pressed portion is positioned above the pivot shaft of the door member.

5. The sheet conveyance apparatus according to claim 3, wherein an upper surface of the casing is positioned above the pivot shaft of the door member.

6. The sheet conveyance apparatus according to claim 1, wherein the casing includes an opening portion configured to expose at least a portion of the lock portion to an exterior of the casing.

7. The sheet conveyance apparatus according to claim 6, wherein the opening portion is disposed on an upper surface of the casing.

8. The sheet conveyance apparatus according to claim 6, wherein the lock portion includes:

a pivot member configured to be engaged with the door unit and supported pivotably by the casing; and an interlock member configured to come into contact with the moving member and to interlock with the pivot member, and wherein at least a portion of the interlock member is exposed to the exterior of the casing through the opening portion.

9. The sheet conveyance apparatus according to claim 8, wherein the interlock member is configured to move in the same direction as the moving member by being pressed by the moving member.

10. The sheet conveyance apparatus according to claim 1, wherein the moving member is detachably attached to the casing.

11. The sheet conveyance apparatus according to claim 1, further comprising an urging member configured to urge the casing in a direction separating from the door unit, wherein the casing is separated from the door unit by the urging member in a case where the lock portion moves from the lock position to the release position.

12. The sheet conveyance apparatus according to claim 1, further comprising:

a sheet accommodating portion configured to accommodate a sheet; and a feeding portion configured to feed the sheet accommodated in the sheet accommodating portion.

13. A sheet conveyance system comprising:

the sheet conveyance apparatus according to claim 1; and the door unit.

14. The sheet conveyance system according to claim 13, wherein the door unit includes an image forming unit configured to form an image on the sheet being conveyed from the sheet conveyance apparatus.

15. The sheet conveyance system according to claim 13, wherein the door unit includes a conveyance path through which the sheet passes, and wherein the door member opens the conveyance path by being opened.

* * * * *